United States Patent
Shimamura et al.

(10) Patent No.: US 7,393,610 B2
(45) Date of Patent: Jul. 1, 2008

(54) LAMINATE PACKAGING FLAT CELL

(75) Inventors: Osamu Shimamura, Yokohama (JP); Takaaki Abe, Yokosuka (JP); Takanori Ito, Zushi (JP); Takamitsu Saito, Yokohama (JP); Hideaki Horie, Yokosuka (JP); Hiroshi Sugawara, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 644 days.

(21) Appl. No.: 10/645,617

(22) Filed: Aug. 22, 2003

(65) Prior Publication Data

US 2004/0043289 A1    Mar. 4, 2004

(30) Foreign Application Priority Data

Sep. 3, 2002    (JP) .......................... P2002-257867

(51) Int. Cl.
*H01M 6/12* (2006.01)
*H01M 6/46* (2006.01)

(52) U.S. Cl. .................. 429/162; 429/163; 429/185

(58) Field of Classification Search ............ 429/162, 429/163, 171, 185, 198, 192
See application file for complete search history.

(56) References Cited

U.S. PATENT DOCUMENTS 4,233,350 A * 11/1980 Shiflet ..................... 428/110
5,425,203 A * 6/1995 Scott ......................... 47/70
6,080,508 A * 6/2000 Dasgupta et al. ........... 429/127
6,225,778 B1 * 5/2001 Hayama et al. ............. 320/112
6,228,778 B1 * 5/2001 Matsuura ................... 438/761
6,465,986 B1 * 10/2002 Haba ......................... 320/116

FOREIGN PATENT DOCUMENTS

| JP | 11-86841 | 3/1999 |
| JP | 11-224652 | 8/1999 |
| JP | 11-345599 | 12/1999 |
| JP | 2000-133218 A | 5/2000 |
| JP | 2001-256934 | 9/2001 |
| JP | 2002-75455 | 3/2002 |
| JP | 2002-510124 | 4/2002 |
| JP | 2004-63278 | 2/2004 |

* cited by examiner

*Primary Examiner*—Patrick Ryan
*Assistant Examiner*—Ben Lewis
(74) *Attorney, Agent, or Firm*—McDermott Will & Emery LLP (57) ABSTRACT

A laminate packaging flat cell comprises a laminate film formed by combining polymer and metal with each other; a power generating element formed of a plurality of electrode plates and separators, and hermetically sealed by the laminate film; and an electrode terminal lead coupled to the electrode plate. In the laminate packaging flat cell of the present invention, the power generating element is hermetically sealed by forming a thermally welded portion on an outer periphery of the laminate film, and the electrode terminal lead protrudes from the thermally welded portion, and a through-hole is provided in a position thereof contacting the thermally welded portion.

8 Claims, 10 Drawing Sheets

OUTSIDE OF CELL

COLLECTOR SIDE

LAMINATE PACKAGING FLAT CELL

BACKGROUND OF THE INVENTION

1. Field of the Invention

The present invention relates to a laminate packaging flat cell enhancing the stability of a thermally welded portion. More specifically, the present invention relates to a laminate packaging flat cell ensuring the stability of an electrode terminal lead and a laminate film in the thermally welded portion by providing a through-hole in the electrode terminal lead of the thermally welded portion, and further relates to a battery module and an assembled battery which are formed of the cells.

2. Description of the Related Art

Recently, air pollution caused by exhaust gas from vehicles has become a global problem. In such a context, electric vehicles, which use electric power as a motive power source, and hybrid cars, which are run by a combination of an engine and a motor, have been attracting attention. Correspondingly, the development of a cell having a high energy density and a high output density to be mounted on these hybrid cars has an important place industrially. As a configuration of a cell for such use, there is a configuration in which a wound electric power generating element is housed within a cylindrical case. In another configuration, a wound electric power generating element or an electric power generating element, which stacks planar electrodes and a separator, is housed within a flat case.

Since these cylindrical or flat cases are required to have enhanced strength, it is necessary to form these cases as metal cans. Therefore, there is a problem in that the reduction of weight is difficult. Thus, as a means of reducing the weight of the cell as well as obtaining a higher energy density and a higher output density, the prior art as described in Japanese Patent Application Laid-Open No. 11-224652 (1999) is cited. In this conventional technology, a structure of the cell using a laminate film as an outer case, a periphery of which is sealed by thermal welding to close the outer case hermetically, has been proposed.

In the cell as described above, which uses the laminate film as the outer case, the sealing capability thereof is sometimes damaged due to a deformation caused by an external force and an increase of an internal pressure caused by a temperature rise of the cell. Particularly, when the cell is mounted on the electric vehicle or the hybrid car, the cell temperature sometimes rises to approximately 60° C. In this case, a large current flows through an electric terminal lead during charge/discharge, and therefore, the temperature of the electrode terminal lead sometimes becomes higher than the cell temperature by approximately 30° C. Hence, the temperature of the electrode terminal lead sometimes reaches a softening point (approximately 90° C.) of resin in the laminate film. In such a situation, the sealing capability of a region where the resin in the laminate film and the electrode terminal lead contact each other is damaged in some cases due to the increase of the cell's internal pressure caused by the rise of the internal temperature thereof. Therefore, in the cell as described above, which uses the laminate film as the outer case, ensuring a sealing capability equivalent to a metal case or more has become an important subject. Accordingly, as a technology of coping with such a request, an attempt has been made, which is to enhance the sealing capability by providing a coating layer formed of olefin resin containing a titanate coupling agent in a position corresponding to the thermally welded portion of the electrode terminal lead. In this case, the olefin resin is also used for an adhesive layer and the innermost layer of the laminate film (refer to Japanese Patent Application Laid-Open No. 2000-133218).

SUMMARY OF THE INVENTION

However, in the above disclosed invention, though the sealing capability, when the cell is used for a camcorder, a cellular phone, a portable computer or the like or, in the initial term after the fabrication of the cell, is maintained, there is a possibility that the long-term reliability thereof under vibration conditions where the cell is mounted on the electric vehicle or the hybrid car cannot be maintained.

Meanwhile, though it is preferable to expand the area of the electrode terminal lead in order to control the resistance thereof, a joint surface between the laminate film and the electrode terminal lead is also expanded if the area of the electrode terminal lead is expanded, leading to yet more difficulty in ensuring the sealing capability.

Moreover, the temperature of the electrode terminal lead sometimes reaches the softening point of the coating resin during the charge/discharge as described above. Furthermore, in some cases, peeling and crevices occur on a joint surface of the electrode terminal lead and the coating resin due to a difference between the thermal expansivity of the electrode terminal lead and the coating resin, and also due to the internal pressure of the cell, resulting in a lowering of the sealing capability. Due to the lowering of the sealing capability, which is described as above, there is a possibility that a liquid leakage will occur, in which an electrolytic solution or a decomposition product thereof oozes from an end of the electrode terminal lead in the cell and moves onto an interface between the electrode terminal lead and the coating resin. Furthermore, a problem of an accelerated deterioration of the coating resin and an outer material occurs, in which the permeating electrolytic solution corrodes the electrode terminal lead resulting in an increase of electrical resistance, which results in further heat generation of the electrode terminal lead during the charge/discharge of a large current.

In this context, the present invention was made in consideration of the above-described problems. It is an object of the present invention to provide a laminate packaging flat cell using a laminate film, as a cell outer material, formed by combining polymer and metal with each other, in which the reliability of the sealing capability of the cell is enhanced, and charge/discharge performance when a large current is used be ensured.

The first aspect of the present invention provides a laminate packaging flat cell, comprising: a laminate film formed by combining polymer and metal with each other; a power generating element formed of a plurality of electrode plates and separators, and hermetically sealed by the laminate film; and an electrode terminal lead coupled to the electrode plate, wherein the power generating element is hermetically sealed by forming a thermally welded portion on an outer periphery of the laminate film, and the electrode terminal lead protrudes from the thermally welded portion, and a through-hole is provided in a position thereof contacting the thermally welded portion.

The second aspect of the present invention provides a battery module, comprising: at least two laminate packaging flat cells connected in series and/or in parallel, the laminate packaging flat cell comprising: a laminate film formed by combining polymer and metal with each other; a power generating element formed of a plurality of electrode plates and separators, and hermetically sealed by the laminate film; and an electrode terminal lead coupled to the electrode plate, wherein the power generating element is hermetically sealed by forming a thermally welded portion on an outer periphery of the laminate film, and the electrode terminal lead protrudes from the thermally welded portion, and a through-hole is provided in a position thereof contacting the thermally welded portion.

The third aspect of the present invention provides an assembled battery, comprising: at least two battery modules connected in series and/or in parallel, the battery modules including a laminate packaging flat cell, the laminate packaging flat cell comprising: a laminate film formed by combining polymer and metal with each other; a power generating element formed of a plurality of electrode plates and separators, and hermetically sealed by the laminate film; and an electrode terminal lead coupled to the electrode plate, wherein the power generating element is hermetically sealed by forming a thermally welded portion on an outer periphery of the laminate film, and the electrode terminal lead protrudes from the thermally welded portion, and a through-hole is provided in a position thereof contacting the thermally welded portion.

The fourth aspect of the present invention provides a vehicle, comprising: an assembled battery including at least two battery modules connected in series and/or in parallel, the battery modules having a laminate packaging flat cell, the laminate packaging flat cell, comprising: a laminate film formed by combining polymer and metal with each other; a power generating element formed of a plurality of electrode plates and separators, and hermetically sealed by the laminate film; and an electrode terminal lead coupled to the electrode plate, wherein the power generating element is hermetically sealed by forming a thermally welded portion on an outer periphery of the laminate film, and the electrode terminal lead protrudes from the thermally welded portion, and a through-hole is provided in a position thereof contacting the thermally welded portion.

The fifth aspect of the present invention provides A method for manufacturing a laminate packaging flat cell, comprising: preparing a laminate film formed by combining polymer and metal with each other; a power generating element formed of a plurality of electrode plates and separators, and hermetically sealed in the laminate film by forming a thermally welded portion on an outer periphery of the laminate film; and an electrode terminal lead coupled to the electrode plate, and having a through-hole provided in a contact portion with the thermally welded portion; attaching an adhesive layer onto the contact portion of at least one surface of the electrode terminal lead; and forming the thermally welded portion by thermally welding the laminate film while interposing the adhesive layer therebetween, and hermetically sealing the power generating element.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

Figure 1A:
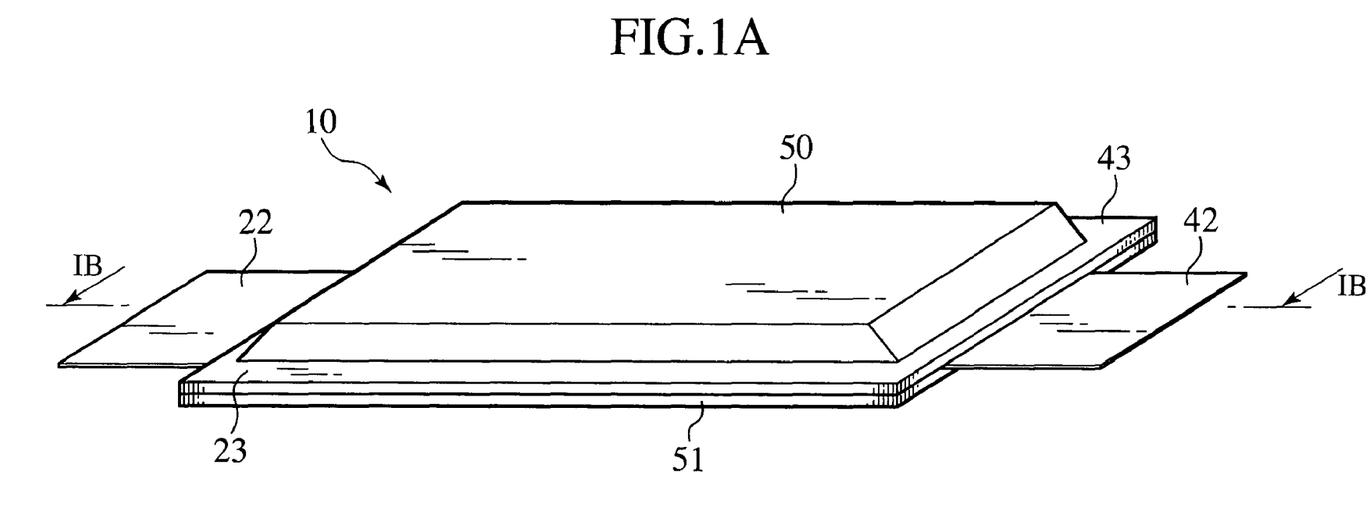
FIG. 1A is a perspective view illustrating an embodiment of a laminate packaging flat cell according to the present invention.
Figure 1B:
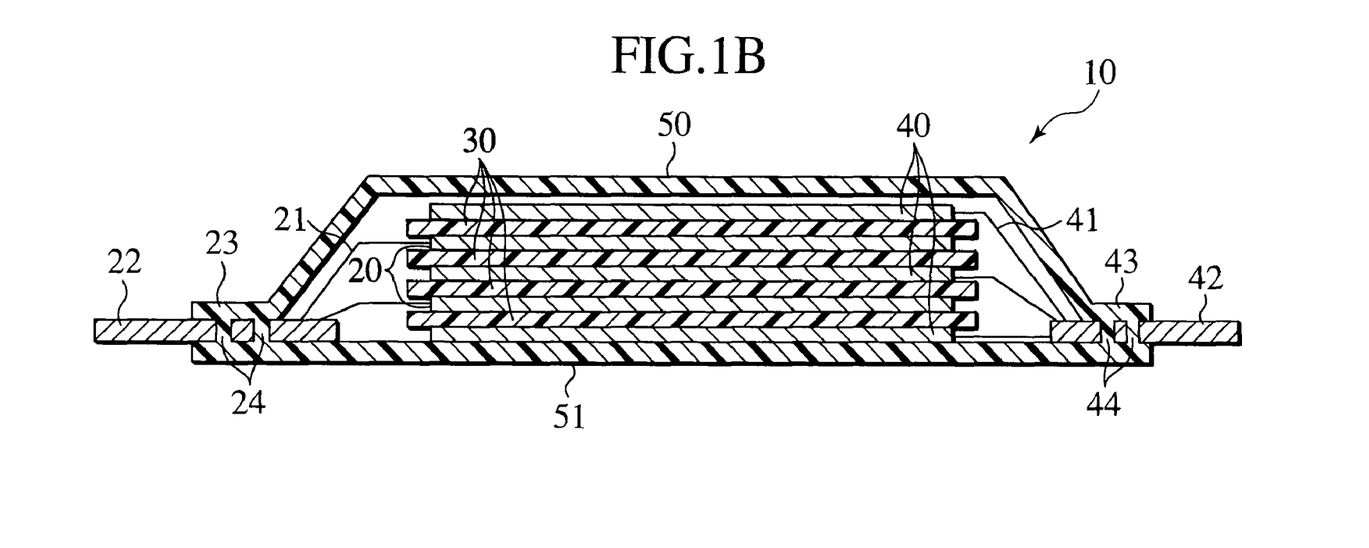
FIG. 1B is a cross-sectional view taken on line IB-IB of FIG. 1A.
Figure 2A:
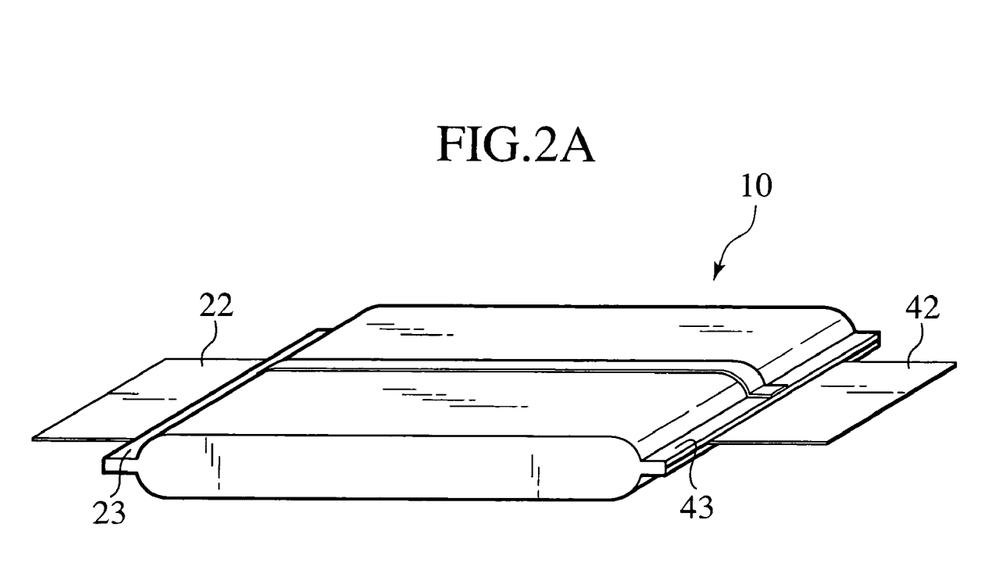
FIGS. 2A and 2B are perspective views illustrating other embodiments of the laminate packaging flat cell according to the present invention.
Figure 2B:
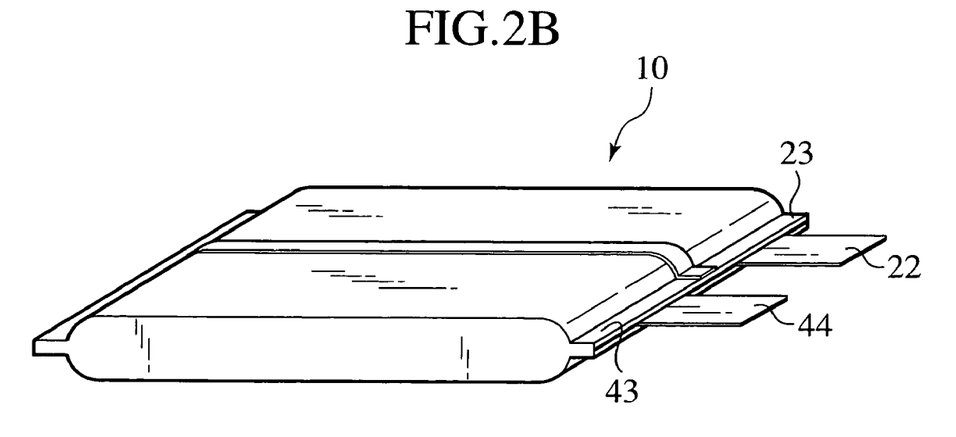

As shown in FIGS. 1A and 1B, a cell 10 according to the present invention is configured in such a manner that a power generating element is hermetically sealed by thermally welding the two laminate films 50 and 51. The power generating element is formed by stacking the positive electrode plates 20 (electrode plate), the spacers 30 and the negative electrode plates 40 (electrode plate). The laminate films 50 and 51 are formed by combining polymer and metal with each other in a vertical direction. The cell 10 is constructed in such a manner that the positive terminal lead 22 (electrode terminal lead) and the negative terminal lead 42 (electrode terminal lead) protrude outward from the thermally welded portion 23 of the positive terminal lead and the thermally welded portion 43 of the negative terminal lead, respectively. The positive terminal lead 22 is coupled to the positive electrode plates 20 by the positive electrode collectors 21, and the negative terminal lead 42 is coupled to the negative electrode plates 40 by the negative electrode collectors 41. The through-holes 24 and 44 are provided in the thermally welded portions 23 and 43 of the positive and negative terminal leads 22 and 42. Note that a method for the thermal welding of a laminate film is not limited to the one in the case as shown in FIG. 1, in which the outer peripheral portion of the cell is thermally welded by the two laminate films. For example, as shown in FIG. 2A, a configuration may be adopted, in which a bag-shaped laminate film is used to house therein the power generating element, only both open ends thereof are thermally welded, and the positive and negative terminal leads 22 and 42 are protruded therefrom, respectively. In addition, as shown in FIG. 2B, the positions from which the positive and negative terminal leads 22 and 42 are taken out may be limited to only one.

Meanwhile, it is preferable that the cell of the present invention be constructed in a flat shape as shown in FIGS. 1A to 2B. This is because it is difficult to ensure long-term reliability of the sealing capability of regions from which the electrode terminal leads are taken out if a round shaped cell structure is adopted in a cell of a high energy density and a high output density, which is mounted on the electric vehicle or the hybrid car.

For the electrodes of the present invention, positive and negative electrodes capable of occluding and desorbing lithium ions are used. The separators and an electrolytic solution, solid electrolyte or gel electrolyte impregnated therein, or alternatively, a solid electrolyte or gel electrolyte acting as the separators are used for the power generating element. For the positive and negative electrodes, separators, the electrolytic solution and the like, publicly known ones are usable. For example, positive and negative electrode active materials are not particularly limited though it is desirable to use a positive electrode active material containing $LiCoO_2$, $LiMn_2O_4$ or $LiNiO_2$ as the main material for the positive electrode and to use a negative electrode active material containing graphite or hard carbon that is amorphous carbon as the main material for the negative electrode. Note that the positive electrode is defined as a portion including the positive electrode collectors and the positive terminal leads attached onto the ends thereof. The positive electrode plates are defined as reaction portions including the positive electrode active material in the positive electrode collectors. In a similar way, the negative electrode is defined as a portion including the negative electrode collectors and the negative terminal leads attached onto the ends thereof. The negative electrode plates are defined as reaction portions including the negative electrode active material in the negative electrode collectors.

In addition, no particular limitations are imposed on the separators as one of the essential elements of the power generating element of the present invention, and publicly known ones can be used therefor. Note that, with regard to the separators of the present invention, the name itself should not limit the selection thereof and the separators may be replaced by the solid electrolyte or gel electrolyte functioning as the separators. The reason is as follows. Specifically, a solid electrolyte cell and a gel electrolyte cell include one configured in such a manner that a power generating element is housed in the outer material formed of the laminate film and enveloped by the thermal welding of a periphery thereof. In this case, the power generating element is formed by disposing the solid electrolyte or the gel electrolyte between the positive electrode active material layers of the positive electrode plates and the negative electrode active material layers of the negative electrode plates. Moreover, the power generating element contains the foregoing electrolytic solution or electrolyte in the same way as before.

In the present invention, the power generating element formed by stacking the positive electrode plates, the separators and the negative electrode plates is configured in a similar way to the conventional power generating element. For example, each of the positive electrode plates is formed by coating and drying the foregoing positive electrode active material on both surfaces of the reaction portion of the positive electrode collector. Each of the negative electrode plates is formed by coating and drying the foregoing negative electrode active material on both surfaces of the reaction portion of the negative electrode collector. Each of the separators is formed of a polymer electrolyte sheet. The positive electrode collectors having the positive electrode active material and the negative electrode collectors having the negative electrode active material are joined to the positive terminal leads and the negative terminal leads, respectively, by ultrasonic welding or the like. This joining may also be performed by resistance welding. However, the configuration of the power generating element of the present invention is not limited to these.

Figure 3A:
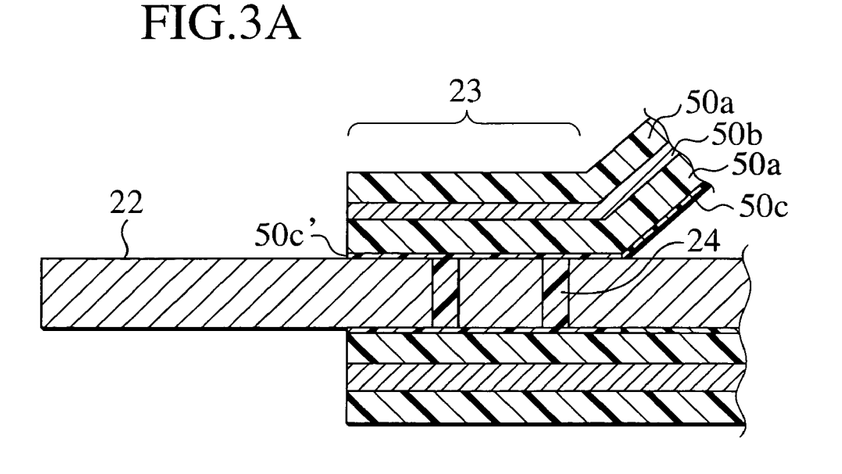
FIG. 3A is an enlarged cross-sectional view illustrating an embodiment of a thermally welded portion of the laminate packaging flat cell according to the present invention.

In addition, while the laminate film formed by combining polymer and metal with each other is used as the outer material, no particular limitations are imposed on the laminate film. A publicly known film formed by disposing a metal film between polymer films and laminating the whole to be integrated is usable. As shown in FIG. 3A, as the laminate film, the outer protection layers 50a (outermost layers of the laminate film, heat resistant insulating films 50a) formed of polymer films, the metal film layer 50b, and the thermally welded layer 50c (innermost layer of the laminate film, thermal welding film 50c) formed of an insulating polymer film are disposed. More specifically, the laminate film is one configured in such a manner that the heat resistant insulating films 50a are formed as polymer films on both surfaces of the metal film layer 50b, and that the thermal welding film 50c is laminated on at least one surface of the heat resistant insulating films 50a. The laminate film is configured by laminating the whole to be integrated. Such a laminate film is thermally welded by an appropriate method, and thus a portion of the thermal welding film 50c is welded and joined to the positive terminal lead 22 to form the thermally welded portion 23.

An aluminum film and the like can be listed as examples of the metal film. In addition, a polyethylene terephthalate film (heat resistant insulating film), a nylon film (heat resistant insulating film), a polyethylene film (thermal welding film), a polypropylene film (thermal welding film) and the like can be listed as examples of the polymer film. However, the outer material of the present invention should not be limited to these. Because of the utilization of the insulating film capable of the thermal welding, the laminate film can be joined easily and securely by a technique such as ultrasonic welding. Note that, in order to enhance the long-term reliability of the cell to the maximum, metal films as constituent elements of the laminate film may be directly joined to each other. In this case, there is a possibility that a short circuit defect will occur when the electrode terminal leads and the metal films contact each other. Therefore, it is preferable to mutually join metal films on a spot in the thermally welded portion where the metal films do not contact the electrode terminal leads. Ultrasonic welding can be used for mutually joining the metal films by removing or destroying the resin located between the metal films.

In the case of using electrode terminal leads with coated surfaces, metal such as aluminum (Al), stainless steel and alloy materials containing these, as well as metal such as copper (Cu) and iron (Fe) are usable as metal to be used as a base material of the electrode terminal leads. It is desirable to use Cu for the base material from the viewpoint of controlling a resistance increase of the entire electrode terminal leads, but the base material is not limited to Cu. In addition, though nickel is most suitable for the surface coating layer, a metal material such as silver or gold is also usable. The surface coating layer can be provided on any one or both of the positive and negative electrode leads.

Among the metal materials to be used for the base material of the electrode terminal leads, metal such as Al is excellent in adhesiveness with the polymer material of the outer material, as understood from the fact that such metal is used for the metal film material of the polymer-metal composite laminate film of the outer material. Therefore, it can be said that it is less necessary to provide the surface coating layers on the electrode terminal leads. On the other hand, metals such as Cu and Fe among the metal materials to be used for the base material are relatively poor in adhesiveness with the polymer material of the outer material. Therefore, it can be said that it is more necessary to provide the surface coating layers. Generally, metal such as Al is used for the base material of the positive terminal lead, and metal such as Cu and Fe is used for the base material of the negative terminal lead.

The present invention is characterized in that the electrode terminal leads having the through-holes in the thermally welded portions are used in the laminate packaging flat cell as described above. While the same can be said for any of the positive and negative terminal leads as the electrode terminal leads, the thermally welded portion of the positive terminal leads will be described.

Figure 3B:
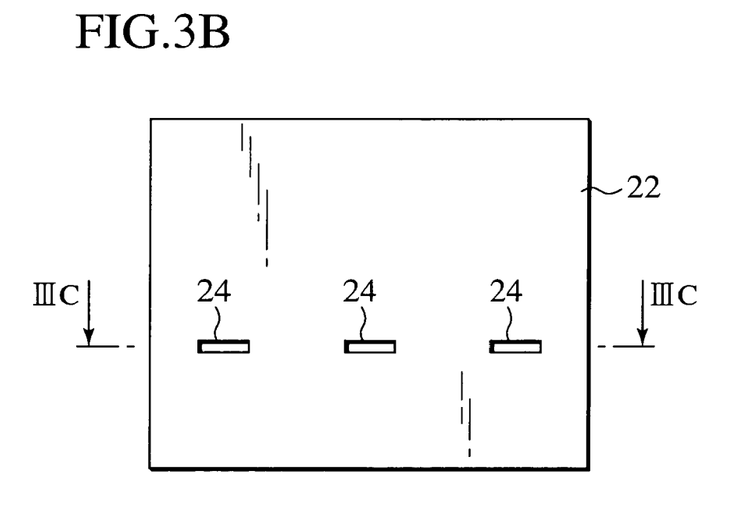
FIG. 3B is a view illustrating an embodiment of an electrode terminal lead of the laminate packaging flat cell according to the present invention.

As shown in FIG. 3B, the positive terminal lead 22 in which the through-holes 24 are provided are used. The number of through-holes may be one or a plurality located arbitrarily. If the positive terminal lead 22 is sandwiched between the laminate films 50 and 51 in the vertical direction, followed by heating, then the thermally welded film 50c becomes the molten resin 50c'. If the molten resin 50c' is cramped by pressure onto the positive terminal lead 22, the molten resin 50c' penetrates into the through-holes 24 of the positive terminal lead 22. Hence, if the molten resin 50c' is solidified after cooling, the thermally welded films 50c of the laminate films are coupled to each other through the through-holes 24 in the vertical direction, and the joining of the thermally welded portion 23 of the positive terminal lead becomes stronger. Particularly, in the case of using the laminate film as the outer material, adhesion between the laminate film and the electrode terminal lead becomes an adhesion between the resin and the metal, and therefore, sometimes, sufficient sealing capability has not been ensured in the case of using the cell for an automobile. However, according to the present invention, the sealing capability can be enhanced easily by providing the through-holes, and the strength of the thermally welded portion of the positive terminal lead is enhanced due to an anchor effect. Moreover, if the through-holes are provided in the manner described above, then the sealing capability for the electrode terminal lead, which is sandwiched in the thermally welded portion and exposed to the outside of the outer material, is improved in long-term reliability to a great extent. Thus, it is also made possible to ensure a good sealing capability for a long period of time. Note that, in a similar way, it is made possible to ensure good sealing capability also for the negative terminal lead.

Figure 4A:
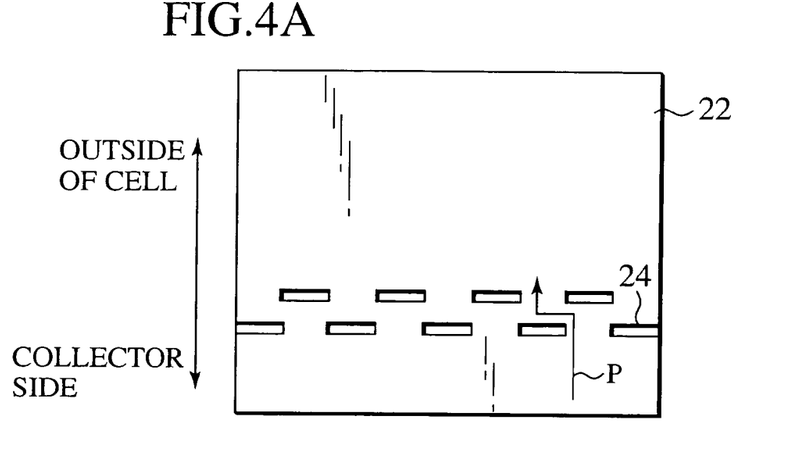
FIGS. 4A, 4B and 4C are views illustrating other embodiments of the electrode terminal lead of the laminate packaging flat cell according to the present invention.
Figure 4B:
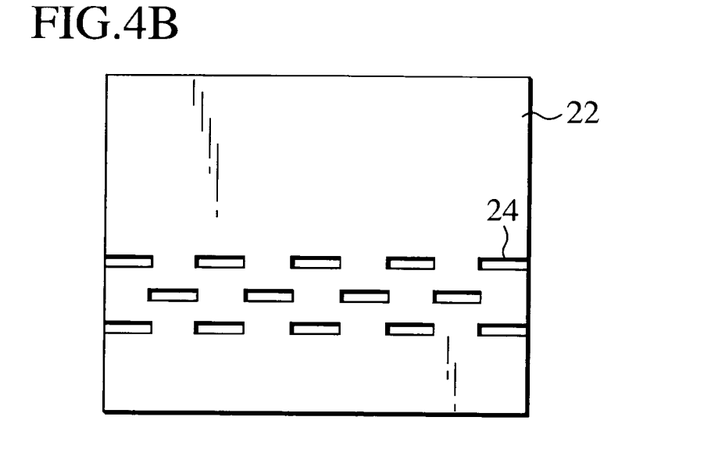

In the present invention, it is preferable that the plurality of through-holes provided in each of the electrode terminal leads be arranged in a staggered way in the thermally welded portion. For example, a case where two rows, in each of which four to five through-holes are included, are provided from the positive electrode collectors side (power generating element side) of the positive terminal lead to the outside of the cell will be described. As shown in FIG. 4A, the through-holes are arranged from the positive electrode collector side to the outside of the cell so as not to overlap with each other. Hence, in the case of providing three rows of the through-holes, the adjacent two rows of through-holes are arranged from the positive electrode collector side to the outside of the cell so as not to overlap with each other as shown in FIG. 4B. In such a manner, it is made possible to elongate the path P through which the electrolytic solution is leaked, and thus, leakage of the electrolytic solution to the outside of the cell can be prevented.

Figure 4C:
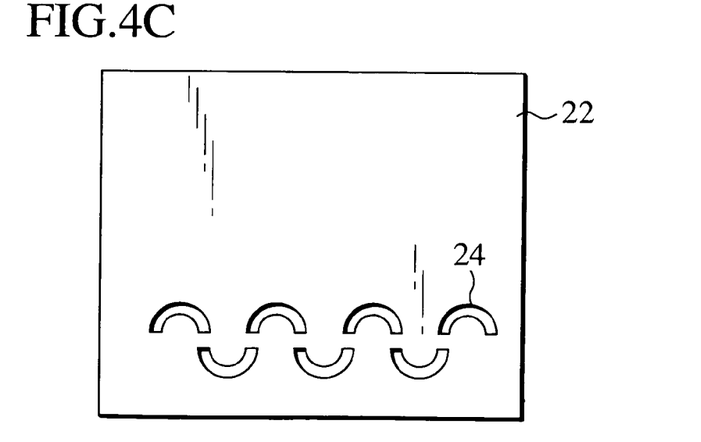

Moreover, the shape of the through-holes is not limited to square and rectangular shapes, but may be circular and elliptical shape, and have different shapes for each row. For example, an alternate arrangement may be made, which includes the first row composed of circular through-holes, the second row composed of elliptical through-holes, and the third row composed of rectangular through-holes, from the positive electrode collector side to the outside of the cell. FIG. 4C shows a positive terminal lead where two rows of circular-arc through-holes are arranged, in which the through-holes are arranged in a staggered way.

Figure 3C:
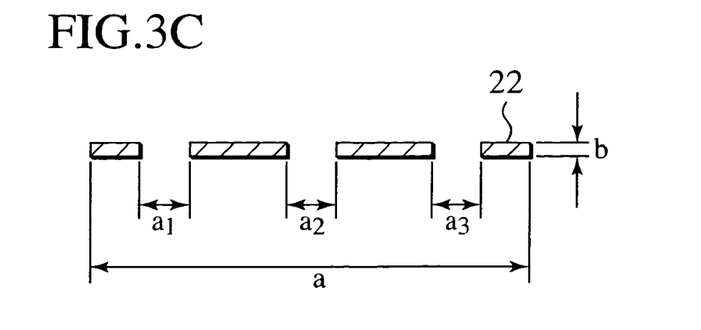
FIG. 3C is a cross-sectional view taken on line IIIC-IIIC of FIG. 3B.

In the present invention, it is preferable that a ratio of the total cross-sectional area of the through-holes be in a range of 20 to 50% of the cross-sectional area of the electrode terminal lead. If the laminate packaging flat cell is used for an automobile while flowing a large current (approximately 100 A) therethrough, the electrode terminal lead sometimes generates heat. Particularly, if the width of the electrode terminal lead is 40 mm or more and the total cross-sectional area of the through-holes exceeds 50%, then the resistance of the electrode terminal lead rises, and the generated heat during the charge/discharge is further increased. If the temperature of the cell during use exceeds 70° C., then the thermal welding film is sometimes softened, thus making it impossible to ensure the sealing capability, though this depends on the material of the thermal welding film of the laminate film. It is preferable that the temperature rise of the electrode terminal lead during use of the cell be controlled to 30° C. or less. If the total cross-sectional area of the through-holes is 50% or less, the temperature rise can be controlled in the range described above. On the other hand, if the total cross-sectional area is less than 20%, the sealing capability is sometimes not sufficiently ensured. The ratio of the cross-sectional area of the through-holes in the present invention will be further described with reference to the surface of the positive terminal lead of FIG. 3B, which is cut along the line IIIC-IIIC. As shown in FIG. 3C, the thickness of the positive terminal lead is set as b, the width thereof is set as a, and the widths of the through-holes are set as $a_1$, $a_2$ and $a_3$. In this case, the total cross-sectional area of the through-holes are represented as $(a_1+a_2+a_3) \times b$, and the cross-sectional area of the positive terminal lead is represented as $a \times b$. Hence, the ratio of total cross-sectional area of the through-holes to the cross-sectional area of the electrode terminal lead can be represented as $((a_1+a_2+a_3)/a) \times 100(\%)$.

In the present invention, an adhesive layer may be provided on at least one surface of the electrode terminal lead. Because the metal film layer is included in the laminate film, a metal portion contacts the electrode terminal lead during the thermal welding to cause a short circuit in some cases. This short circuit defect can be prevented by interposing the adhesive layer therebetween.

Figure 5A:
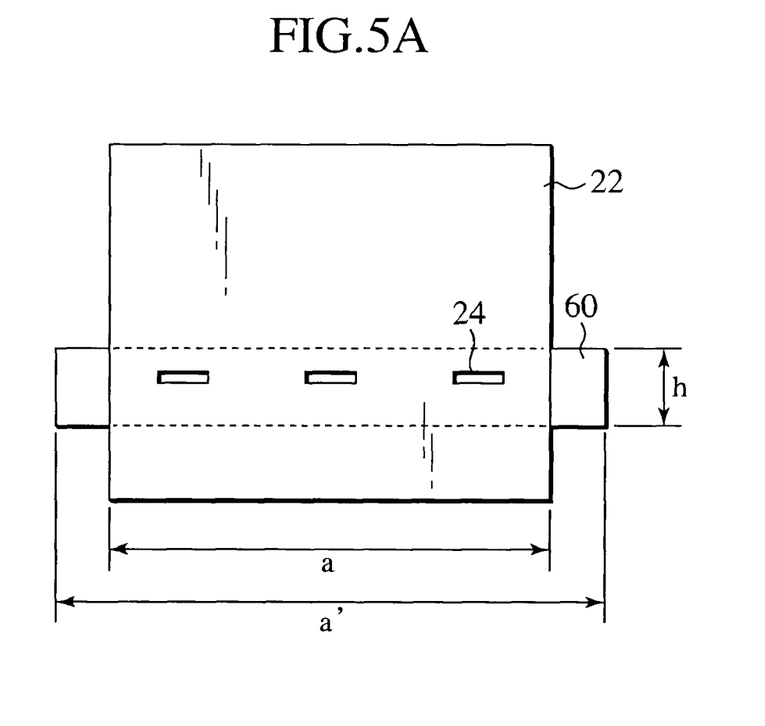
FIG. 5A is a schematic view illustrating an embodiment of the electrode terminal lead of the laminate packaging flat cell, in which an adhesive layer is provided, according to the present invention.
Figure 5B:
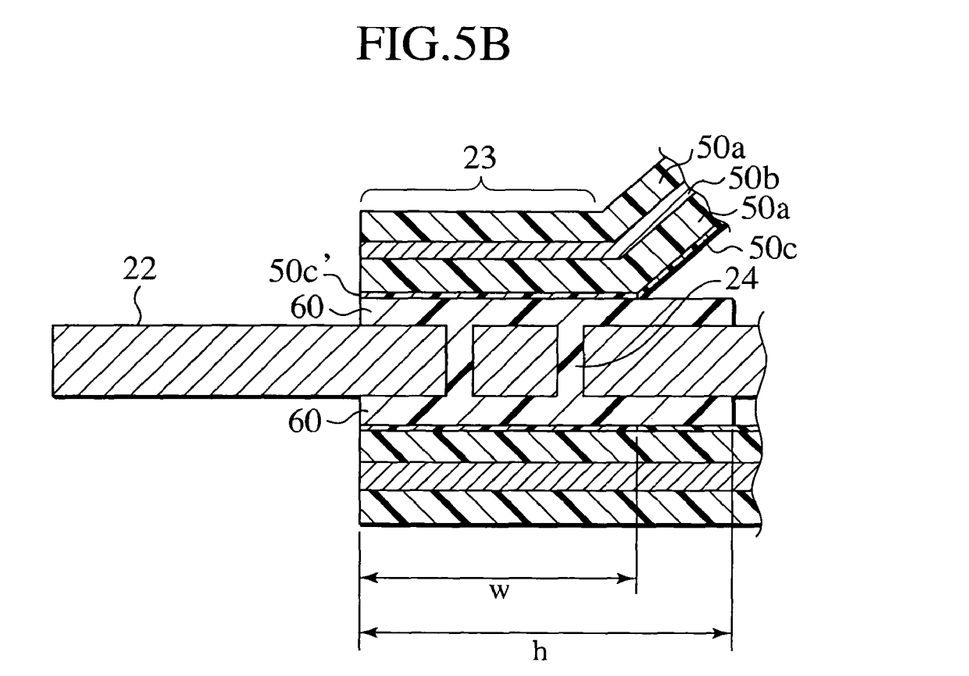
FIG. 5B is an enlarged cross-sectional view illustrating the thermally welded portion of the laminate packaging flat cell, in which an adhesive layer is provided, according to the present invention.

FIGS. 5A and 5B show the positive terminal lead 22 having the adhesive layer 60. Although the width a' of the adhesive layer 60 may be equal to the width a of the positive terminal lead 22, it is preferable that the width a' be larger than the width a. This is for the purpose of effectively preventing the short circuit defect between the positive terminal lead and the metal film layer included in the laminate film. In addition, for the width h of the adhesive layer needs a length long enough to cover the through-holes therewith. In order to enhance the sealing capability, it is preferable that the width h be equal to or more than the width w of the thermally welded portion 23 of the positive terminal lead. Moreover, the adhesive layer may be provided on one or both surfaces of the electrode terminal lead. The sizes of the adhesive layer used in this case may differ for each of the cases.

For the resin of the adhesive layer as described above, there are polyethylene, polypropylene, modified polypropylene, a two-layer structure of modified polypropylene and heat resistant cross-linked polypropylene, a three-layer structure of modified polypropylene, heat resistant cross-linked polypropylene and modified polypropylene, and the like. It is preferable that any of polyethylene, polypropylene and modified polypropylene be used at least on the contact surface with the thermal welding film of the laminate film. This is due to the adhesive layer which is excellent in thermal welding characteristics with the thermal welding film, because the thermal welding film of the laminate film, which is used in the present invention, is a polyethylene film, a polypropylene film or the like. Particularly, with regard to the characteristics of polypropylene, rigidity is high, thermal denaturation temperature is high, stress cracking is low, and resistance to a repeated bending stress is high. Therefore, it is preferable that the adhesive layer be particularly a single layer of polypropylene or modified polypropylene, or a laminate having such a single layer on a surface layer. If the thermal welding is performed by use of the adhesive layer thus composed, then the adhesive layer is also inserted into the inside of the through-holes 24 as shown in FIG. 5B, and thus the sealing capability is enhanced, and the short circuit defect can be prevented simultaneously. The case of providing the adhesive layers on both surfaces of the positive terminal lead is illustrated as an example in FIG. 5B. However, even if the adhesive layer is disposed on one surface of the positive terminal lead, the sealing capability can be enhanced efficiently, which is preferable.

No limitations are imposed on the size of the laminate packaging flat cell of the present invention. However, from the viewpoint of the strength of the thermally welded portion of the electrode terminal lead, it is preferable that the thickness of the electrode terminal lead be 300 μm or less.

In the case of manufacturing the laminate packaging flat cell having the adhesive layer, the cell can be manufactured in the same way as before except that the positive and negative terminal leads having the through-holes in the portions corresponding to the thermally welded layers are used, in which the adhesive layers are at least adhered onto the one-side surfaces. Regarding the size and arrangement of the through-holes provided on the positive and/or negative terminal lead, the ratio of the cross-sectional area of the through-holes to the cross-sectional area of the electrode terminal lead, the size of the electrode terminal lead, the area where the thermal welding is performed, and the like, similar conditions to those for the laminate packaging flat cell in which the adhesive layer is not provided can be employed. The present invention is characterized in that the sealing capability can be enhanced more than the conventional cell without changing the conventional manufacturing process, and that the strength of the thermally welded portions of the electrode terminal leads can be enhanced due to the anchor effect by use of the electrode terminal leads added with the adhesive layers.

The thermal welding temperature can be selected appropriately depending on the type of the adhesive layer. Generally, the thermal welding temperature is in a range of 210 to 230° C., and more preferably, in a range of 215 to 225° C. Moreover, the thermal welding time is 7 to 10 seconds, and more preferably, 8 to 9 seconds.

Figure 6:
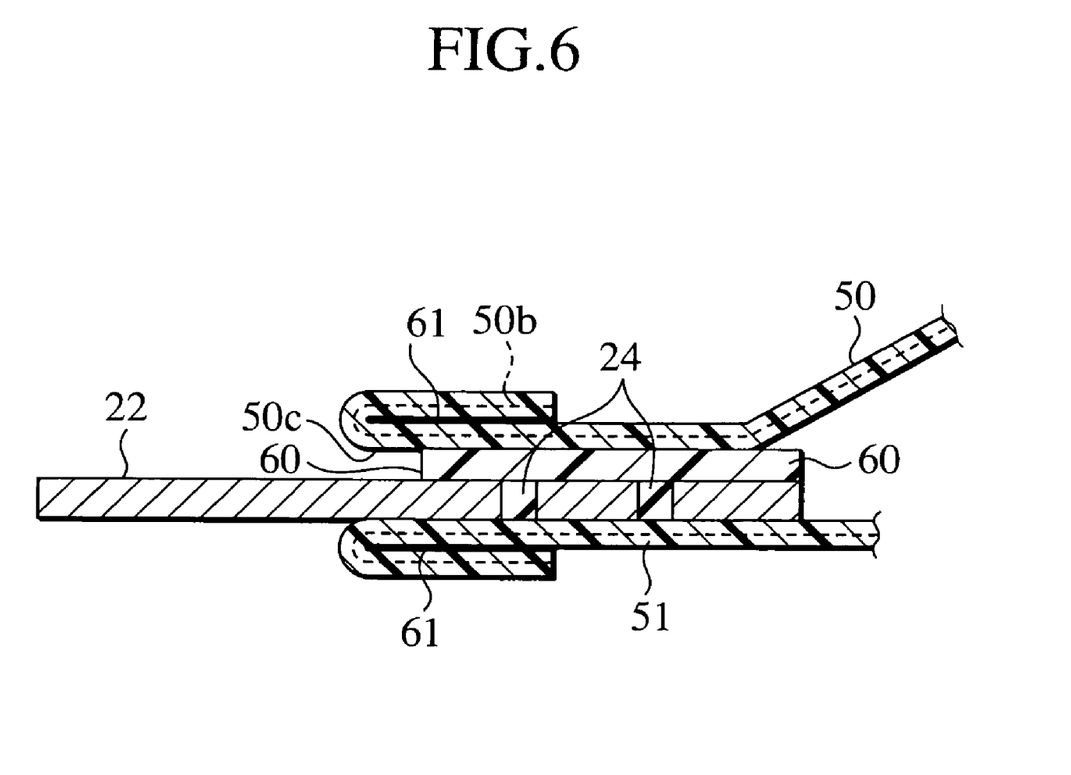
FIG. 6 is an enlarged cross-sectional view illustrating another embodiment of the thermally welded portion of the laminate packaging flat cell according to the present invention.

In the present invention, the ends of the laminate films may be folded back to the outside and thermally welded to each of the electrode terminal leads. This is because the contact of the metal film included in the laminate film and the electrode terminal lead can be prevented and the short circuit defect can be prevented. As shown in FIG. 6, the adhesive layer 60 is provided on only one surface of the positive terminal lead 22, and the ends of two laminate films are bent outward and thermally welded, such that the metal films 50b included in the laminate films do not contact the positive terminal lead 22. The ends are bent in such a way that the sealing capability can be ensured, the strength of the electrode terminal lead can be enhanced due to the anchor effect, and the short circuit between the laminate films and the electrode terminal lead can be prevented. It is preferable that the adhesive layers 61 also be provided on the bent portions in order to maintain such a bent state. In some cases, the outermost layers of the laminate films have the heat resistant insulating characteristics but do not have the thermal welding characteristics. In the case of using the laminate films as described above, the interposition of the adhesive layers 61 maintains the bent state for a long period.

Figure 7A:
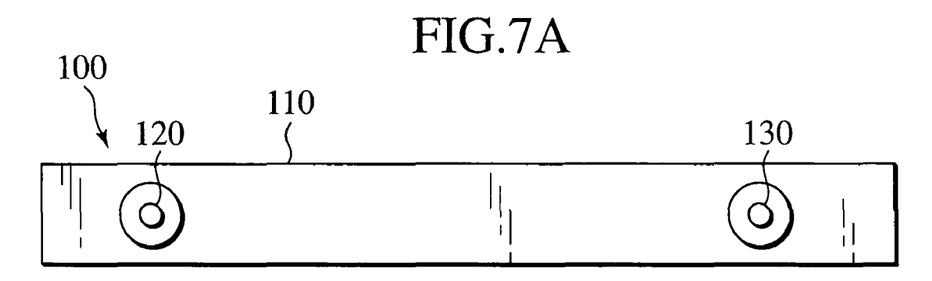
FIG. 7A is an elevational view illustrating an embodiment of a battery module according to the present invention.
Figure 7B:
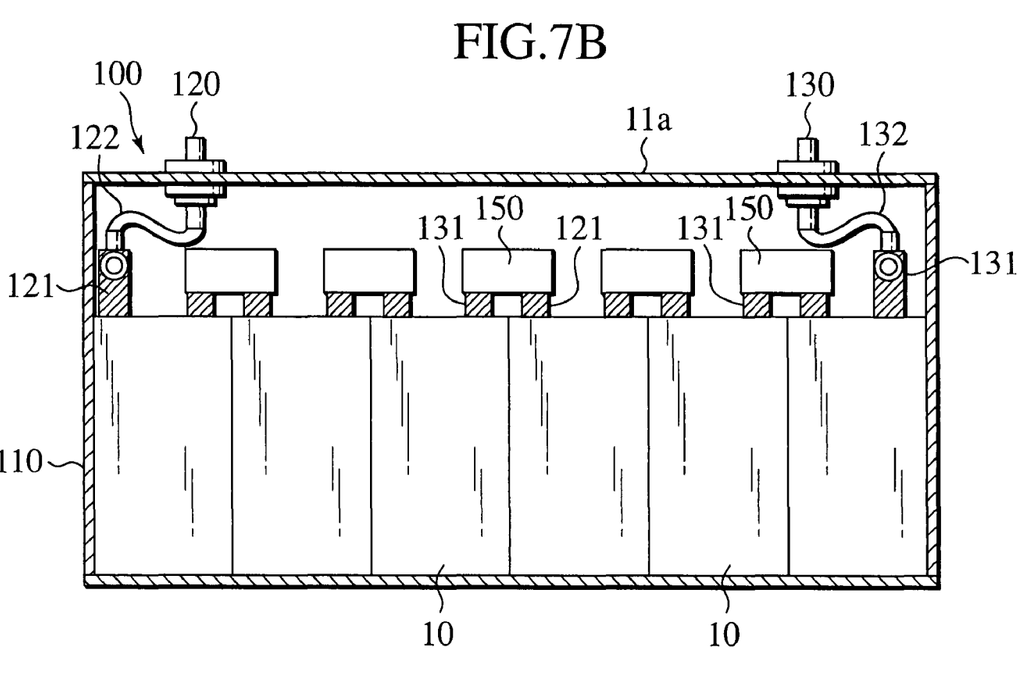
FIG. 7B is a cross-sectional view illustrating an embodiment of the battery module according to the present invention.
Figure 7C:
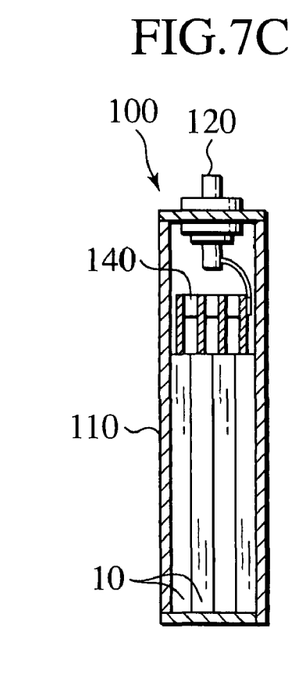
FIG. 7C is a plan view illustrating an embodiment of the battery module according to the present invention.

In the present invention, a battery module can be configured by connecting at least two laminate packaging flat cells described above in series and/or in parallel. The battery module of the present invention is shown in FIGS. 7A, 7B and 7C. As shown in FIGS. 7B and 7C, the battery module 100 can be configured in such a manner that four pieces of the flat cells 10 described above are connected in parallel, six sets of the flat cells 10, each set having the four pieces of the cells 10 connected in parallel, are connected in series, and the sets of the flat cells 10 are housed in the battery module case 110 made of metal. The positive and negative terminals 120 and 130 provided on the lid on the battery module case 110 and the electrode terminal leads 121 and 131 of the flat cells 10 are connected to each other by use of the lead wires 122 and 132, respectively. Moreover, in the case of connecting the four pieces of the flat cells 10 in parallel, it is satisfactory if the electrode terminal leads 121 of the respective flat cells 10 are electrically connected by use of appropriate conductive connecting members such as the spacers 140 as shown in FIG. 7B. In a similar way, in the case of further connecting, in series, the six sets of the flat cells 10, each set having the four flat cells 10 connected in parallel, it is satisfactory if the electrode terminal leads 121 and 131 of the respective flat cells 10 are electrically connected sequentially by use of appropriate connecting members such as the busbars 150 as shown in FIG. 7B. However, the battery module of the present invention is not limited to the one described here, and a publicly known one can be employed when appropriate. In addition, a variety of measurement and control devices may be provided on the battery module according to the purpose. For example, a connector for measuring a voltage may be provided on the lid on the battery module case 110 for the purpose of monitoring the voltage of the cell.

Meanwhile, in the present invention, it is also preferable to connect the four pieces of the flat cells 10 electrically in series. This case, where the four flat cells 10 are connected in series, is considered. Although the total voltage may differ depending on the operating voltage of a single cell, the total voltage will be 14V if the operating voltage of the single cell is 3.5V, and this 14V of power can be applied to a current 12V power supply. If 12 pieces of the single cells are connected in series, then the total voltage will be 42V, which can be applied to a transmission voltage in the future. If 96 pieces of the single cells are connected in series, then the total voltage can be applied to a current power supply for electric vehicles or hybrid electric vehicles. Particularly, the voltage of 42V is an effective voltage for a motor-operated valve, an electric brake and the like in practical use. As described above, the number of single cells is set at multiples of 4, thus making it possible to obtain a battery module depending on the utilization purpose thereof.

Figure 8:
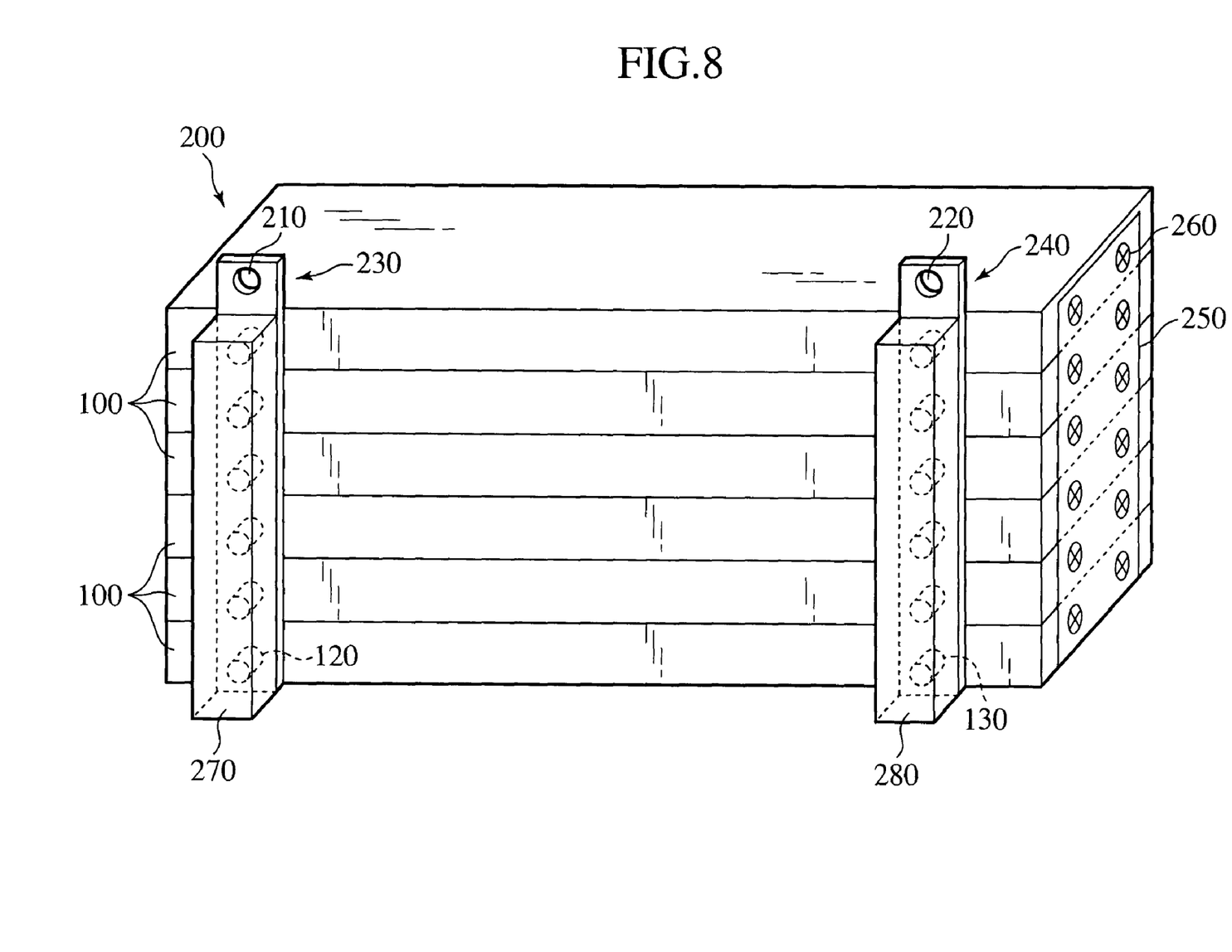
FIG. 8 is a perspective view illustrating an embodiment of an assembled battery according to the present invention.

Next, at least two battery modules as described above are connected in series and/or in parallel, and thus an assembled battery is configured. Thus, it is made possible to cope with a demand for a relatively low cost regarding cell capacity and output, which vary according to purpose, without manufacturing a new battery module in order to cope therewith. In order to configure the assembled battery 200 by connecting six sets of the battery modules 100 as described above in parallel as described in FIG. 8, the positive and negative terminals 120 and 130 of the battery modules 100 provided on the lids of the respective battery module cases 110 are mutually connected electrically by use of the positive and negative electrode coupling plates 230 and 240 having the outer positive and negative terminals 210 and 220, respectively. In addition, respective screw holes (not shown) provided on both side surfaces of the battery module cases 110 and the coupling plates 250 are fixed together by the screws 260, and thus the battery modules 100 are coupled together. Moreover, the positive and negative terminals 120 and 130 of the battery modules 100 are protected by the positive and negative electrode insulating covers 270 and 280, respectively. The insulating covers are identified from each other by means of color coding using appropriate colors, for example, red and blue.

Figure 9:
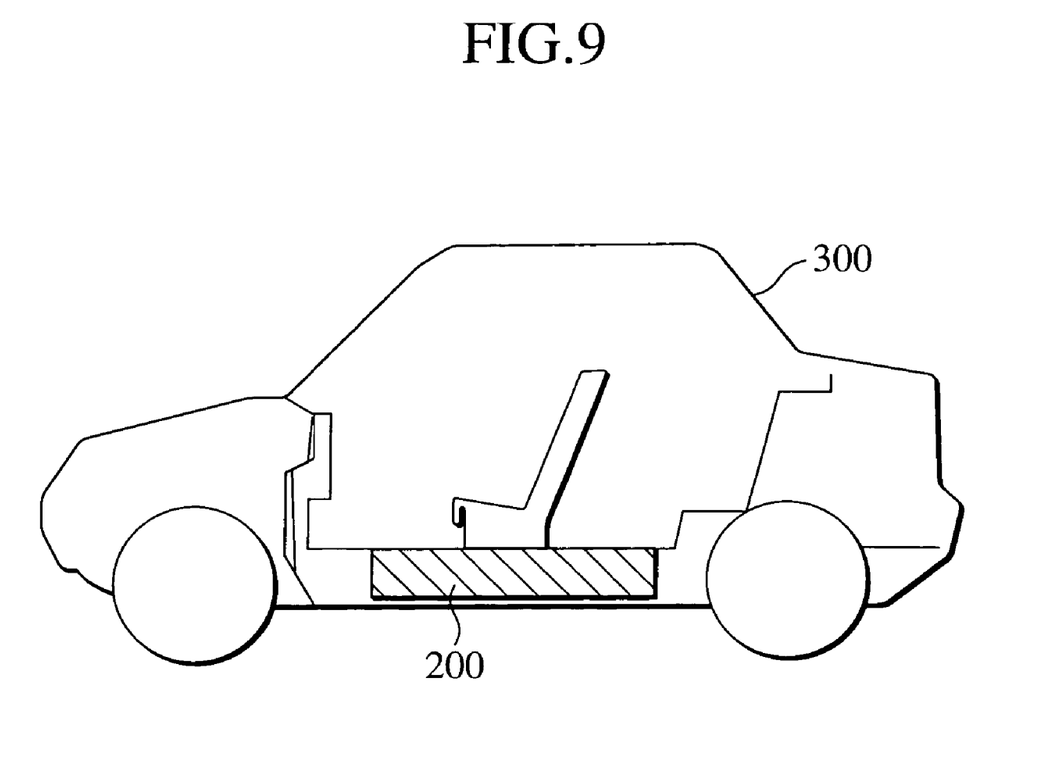
FIG. 9 is a schematic view illustrating a vehicle, on which the battery module of the present invention is mounted.

Moreover, even when the battery module and/or the assembled battery are mounted on the electric vehicle or the hybrid car, a good sealing capability thereof can be ensured for a long period, and the lifetime thereof can be enhanced. With regard to a mounting place of the assembled battery of this application, for example, as shown in FIG. 9, the assembled battery 200 is mounted under a seat in the center of the electric vehicle or the hybrid car 300. This is convenient because a vehicle's interior space and trunk room can be designed so as to be wide. However, the present invention is not limited to the above, and the assembled battery 200 may be mounted under the rear trunk room, or alternatively, can be mounted in a region in the front of a vehicle where an engine should be mounted, if the engine is not mounted as in the electric vehicle. Note that, in the present invention, according to the purpose, not only the assembled battery 200 but also the battery module 100 may be mounted, or the battery module and the assembled battery may be mounted in combination. Moreover, though the electric vehicle and the hybrid car, which are described above, are preferable as vehicles that can mount thereon the battery module and/or assembled battery of the present invention, the vehicle is not limited to these.

The present invention will be described below based on specific examples.

EXAMPLE 1

The laminate packaging flat cell shown in FIG. 1A was manufactured by use of laminate films, in each of which the thermal welding films were polypropylene and the metal film was aluminum.

For the electrodes, positive electrodes using $LiMn_2O_4$ as a positive electrode active material and negative electrodes using amorphous carbon as a negative electrode active material were used. For the positive terminal lead, an Al plate having a thickness of 150 μm was used. For the negative terminal lead, a Ni plate having a thickness of 150 μm was used. Each of the positive and negative terminal leads were 45 mm wide and 40 mm long. In each of the electrode terminal leads, three through-holes, each having a size of 5 mm×3 mm, were arrayed in one row at an interval of 7.5 mm. The ratio of the cross-sectional area of the through-holes to the cross-sectional area of each electrode terminal lead was 33%.

Adhesive layers formed of modified polypropylene, each having an area of 10 mm×48 mm×0.1 mm, were attached onto both surfaces of each electrode terminal lead by the thermal welding with the through-hole array taken as a center.

Subsequently, these adhesive layers and the electrode terminal lead were sandwiched by the laminate films in the vertical direction, and peripheral portions thereof were joined together by thermal welding and the whole was sealed such that a power generating element was housed therein. Thus, a flat cell was fabricated. The capacity of this flat cell was approximately 2 Ah. The thermal welding process was performed at a temperature of 230° C. for 7 seconds.

EXAMPLE 2

Regarding the through-holes provided in each electrode terminal lead, four or five through-holes, each having a size of 4 mm×1 mm, were arrayed in each row at an interval of approximately 6 mm. Two of the described rows were provide in each electrode terminal lead. In a similar way to Example 1 except for the above, a laminate packaging flat cell was fabricated. The ratio of the cross-sectional area of the through-holes to the cross-sectional area of each terminal lead was 44%.

EXAMPLE 3

An Al plate having a thickness of 300 μm was used for the positive terminal lead, and a Ni plate having a thickness of 300 μm was used for the negative terminal lead. In a similar way to Example 1 except for the above, a laminate packaging flat cell was fabricated.

EXAMPLE 4

An Al plate having a thickness of 600 μm was used for the positive terminal lead, and a Ni plate having a thickness of 600 μm was used for the negative terminal lead. In a similar way to Example 1 except for the above, a laminate packaging flat cell was fabricated.

EXAMPLE 5

Three through-holes, each having a length of 4 mm and a width of 2 mm, were arrayed in one row at an interval of 9 mm. In a similar way to Example 4 except for the above, a laminate packaging flat cell was fabricated. In this cell, the ratio of the cross-sectional area of the through-holes to the cross-sectional area of the electrode terminal lead was approximately 26%.

EXAMPLE 6

Four through-holes, each having a length of 2 mm and a width of 2 mm, were arrayed in one row at an interval of 9.3 mm. In a similar way to Example 4 except for the above, a laminate packaging flat cell was fabricated. In this cell, the ratio of the cross-sectional area of the through-holes to the cross-sectional area of the electrode terminal lead was approximately 18%.

COMPARATIVE EXAMPLE 1

No through-holes were provided in each electrode terminal lead. In a similar way to Example 4 except for the above, a cell was fabricated.

Temperature Rise Test

By use of the laminate packaging flat cells manufactured in Examples 1 and 2, charging/discharging was repeated at 50 A, with turning-on for 5 seconds and pausing for 25 seconds being set as 1 cycle. Rising temperatures of the electrode terminal leads in this case were measured, and the results thereof are shown in FIG. 10.

Figure 10:
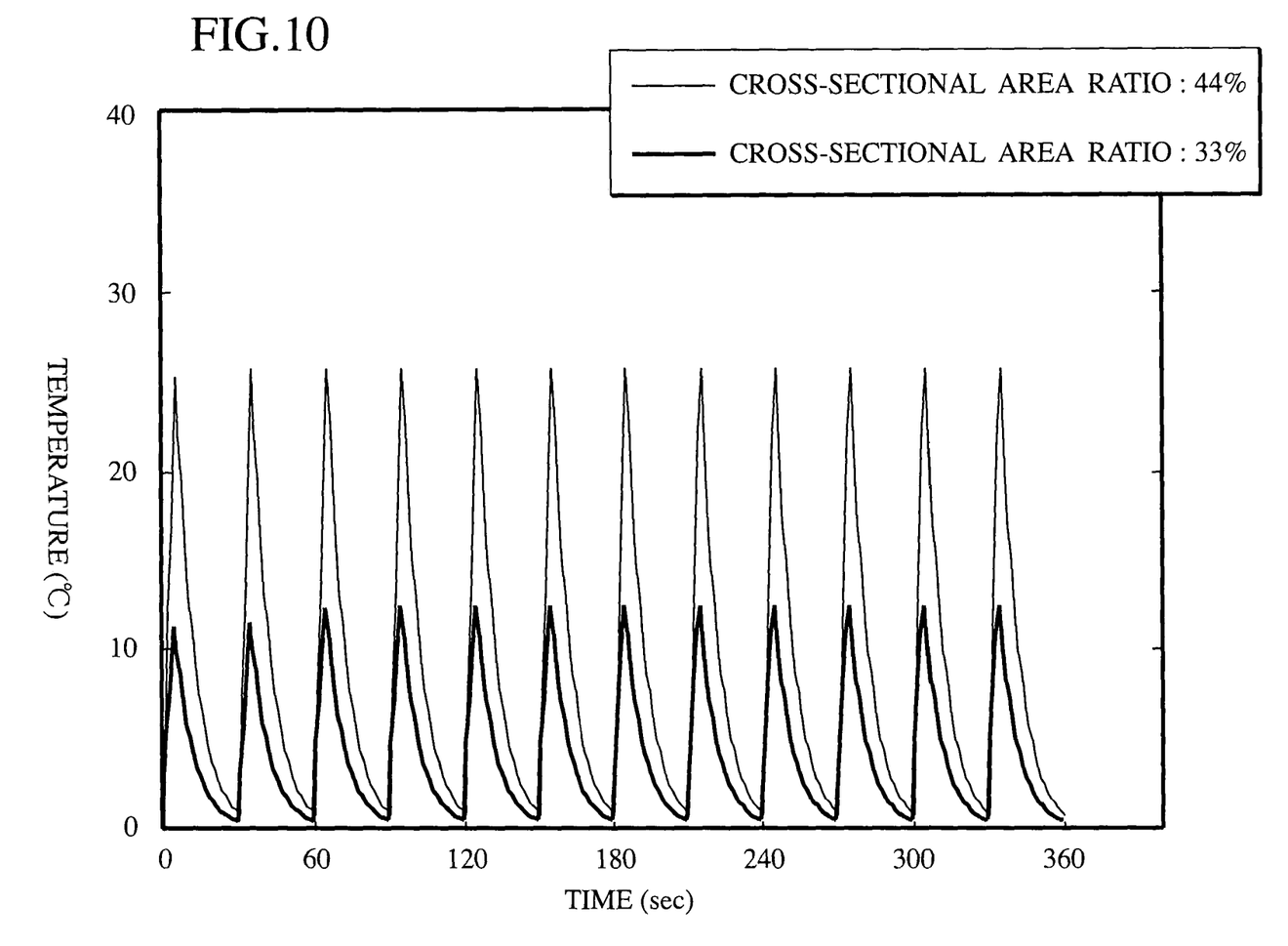
FIG. 10 is a graph illustrating a result of a temperature rise test.

As shown in FIG. 10, the rising temperature in the case of Example 1 where the ratio of the cross-sectional area of the through-holes was 33% was lower than that in the case of Example 2 where the ratio of the cross-sectional area was 44%.

Aging Test and Peeling Strength Test

With regard to each of Examples 1 to 6 and Comparative Example 1, five pieces of the laminate packaging flat cells were used. These cells were left in an atmosphere of 40° C. for 60 days. Thereafter, it was examined whether a liquid leakage had occurred in each of the cells. In addition, for each of these cells left for 60 days, the thermally welded portions of the electrode terminal leads were cut in a width of 20 mm. The peeling strengths of the thermally welded portions were measured by a peeling strength test. One in which a peeling strength ratio (peeling strength after leaving/initial peeling strength) was 0.5 or more was regarded as acceptable.

TABLE 1

|  | Liquid leakage after aging test | Peeling strength ratio |
|---|---|---|
| Example 1 | None | 1 |
| Example 2 | None | 0.9 |
| Example 3 | None | 0.9 |
| Example 4 | None | 0.9 |
| Example 5 | None | 0.8 |
| Example 6 | None | 0.5 |
| Comparative example 1 | Present (Liquid leakage in 1 out of 5) | 0.4 |

According to Table 1, because the through-holes were provided in the electrode terminal leads in Examples 1 to 6, the sealing capability was enhanced, and the occurrence of liquid leakage was eliminated. Moreover, the peeling strength was also enhanced due to the through-holes, and the reliability of the cell was enhanced.

The entire content of Japanese Patent Application No. P2002-257867 with a filing date of Sep. 3, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A laminate packaging flat cell, comprising:
   a laminate film formed by combining polymer and metal with each other;
   a power generating element formed of a plurality of electrode plates and separators, and hermetically sealed by the laminate film; and
   an electrode terminal lead coupled to the electrode plate, wherein the power generating element is hermetically sealed by forming a thermally welded portion on an outer periphery of the laminate film, and
   wherein the electrode terminal lead protrudes from the thermally welded portion in a protruding direction, a plurality of through-holes are provided in the electrode terminal lead in a position thereof contacting the thermally welded portion, the through-holes form first and second rows along a widthwise direction of the electrode terminal lead that is substantially perpendicular to the protruding direction, the through-holes in the first row are arranged to offset to the through-holes in the second row without a gap in the widthwise direction when viewed along the protruding direction, and a ratio of a cross-sectional area of the through-holes to a cross-sectional area of the electrode terminal lead along the widthwise direction ranges from 20 to 50%.

2. A laminate packaging flat cell according to claim 1, wherein an adhesive layer is provided on at least one surface of the electrode terminal lead.

3. A laminate packaging flat cell according to claim 1, wherein an end of the laminate film joined to the electrode terminal lead is folded on itself.

4. A laminate packaging flat cell according to claim 1, wherein the through-holes are elongated along a widthwise direction of the electrode terminal lead that is substantially perpendicular to the protruding direction.

5. A laminate packaging flat cell according to claim 4, wherein the electrode terminal lead further comprises a plurality of through holes.

6. A laminate packaging flat cell according to claim 4, wherein said through holes are arcuately-shaped.

7. A method for manufacturing a laminate packaging flat cell, comprising:
   preparing a laminate film formed by combining polymer and metal with each other; a power generating element formed of a plurality of electrode plates and separators, and hermetically sealed in the laminate film by forming a thermally welded portion on an outer periphery of the laminate film; and an electrode terminal lead coupled to the electrode plate protruding from the thermally welded portion in a protruding portion, and having a plurality of through-holes provided in the electrode terminal lead in a contact portion with the thermally welded portion, the through-holes form first and second rows along a widthwise direction of the electrode terminal lead that is substantially perpendicular to the protruding direction, the through-holes in the first row are arranged to offset to the through-holes in the second row without a gap in the widthwise direction when viewed along the protruding direction, and a ratio of a cross-sectional area of the through-holes to a cross-sectional area of the electrode terminal lead along the widthwise direction ranges from 20 to 50%;
   attaching an adhesive layer onto the contact portion of at least one surface of the electrode terminal lead; and
   forming the thermally welded portion by thermally welding the laminate film while interposing the adhesive layer therebetween, and hermetically sealing the power generating element.

8. A laminate packaging flat cell, comprising:
   a laminate film formed by combining polymer and metal with each other;
   a power generating element formed of a plurality of electrode plates and separators, and hermetically sealed by the laminate film; and
   an electrode terminal lead coupled to the electrode plate, wherein the power generating element is hermetically sealed by forming a thermally welded portion on an outer periphery of the laminate film, and wherein the electrode terminal lead protrudes from the thermally welded portion in a protruding direction, a plurality of through-holes are provided in the electrode terminal lead in a position thereof contacting the thermally welded portion, the through-holes being arranged to prevent leakage of electrolyte linearly along the protruding direction through a location of the thermally welded portion of the laminate film where the terminal electrode lead protrudes, and a ratio of a cross-sectional area of the through-holes to a cross-sectional area of the electrode terminal lead along the widthwise direction ranges from 20 to 50%.

* * * * *